(12) United States Patent
Archambault et al.

(10) Patent No.: US 11,108,489 B1
(45) Date of Patent: Aug. 31, 2021

(54) REDUCING CONNECTION VALIDATION (CV) TIME IN AN OPTICAL NODE

(71) Applicant: Ciena Corporation, Hanover, MD (US)

(72) Inventors: Jean-Luc Archambault, Ottawa (CA); Edward Chen, Kanata (CA); Paul Chedore, Ottawa (CA); Choudhury A. Al Sayeed, Stittsville (CA); David C. Bownass, Ottawa (CA); David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/039,157

(22) Filed: Sep. 30, 2020

(51) Int. Cl.
  *H04B 10/073* (2013.01)
  *H04J 14/02* (2006.01)

(52) U.S. Cl.
  CPC ........ *H04J 14/0212* (2013.01); *H04B 10/073* (2013.01); *H04J 14/0209* (2013.01)

(58) Field of Classification Search
  CPC .................................................. H04B 10/073
  See application file for complete search history.

(56) References Cited

U.S. PATENT DOCUMENTS

| 6,404,948 B2 | 6/2002 | Alexander et al. |
| 6,795,607 B1 | 9/2004 | Archambault et al. |
| 7,809,272 B2 | 10/2010 | Zhong et al. |
| 8,364,036 B2 | 1/2013 | Boertjes et al. |
| 8,457,497 B2 | 6/2013 | Zhong et al. |
| 8,509,621 B2 | 8/2013 | Boertjes et al. |
| 8,625,994 B2 | 7/2014 | Archambault et al. |
| 8,774,632 B2 | 7/2014 | Archambault |
| 9,060,215 B2 | 6/2015 | Miedema |
| 9,680,569 B2 | 6/2017 | Archambault et al. |
| 9,793,986 B2 | 10/2017 | Archambault et al. |
| 9,806,803 B2 | 10/2017 | Bownass et al. |
| 9,882,634 B1 | 1/2018 | Al Sayeed et al. |
| 9,973,295 B2 | 5/2018 | Al Sayeed et al. |
| 10,063,313 B1 | 8/2018 | Al Sayeed et al. |
| 10,237,011 B2 | 3/2019 | Al Sayeed et al. |
| 10,277,352 B2 | 4/2019 | Chedore et al. |
| 10,439,709 B1 | 10/2019 | Al Sayeed |
| 10,536,235 B2 | 1/2020 | Al Sayeed et al. |
| 10,541,748 B1 | 1/2020 | Chedore |
| 10,630,417 B1 | 4/2020 | Chedore et al. |
| 10,680,737 B1 | 6/2020 | Al Sayeed et al. |
| 10,680,739 B2 | 6/2020 | Swinkels et al. |
| 10,735,837 B1 | 8/2020 | Al Sayeed et al. |
| 2009/0154941 A1 | 6/2009 | Mateosky et al. |
| 2011/0200324 A1* | 8/2011 | Boertjes ............... H04J 14/0212 398/16 |

(Continued)

*Primary Examiner* — Shi K Li
(74) *Attorney, Agent, or Firm* — Clements Bernard Walker; Lawrence A. Baratta, Jr.; Christopher L. Bernard

(57) ABSTRACT

Systems and methods for conducting various types of Connection Validation (CV) are provided for reducing the overall CV scan time of regular CV scans. A method, according to one implementation, includes a step of receiving a request to perform a focused CV on one or more communication cables after the one or more communication cables are physically connected or reconnected into a portion of a network. The method also includes the steps of interrupting an ongoing CV running in the portion of the network and executing the focused CV to target a CV scan on the one or more communication cables.

20 Claims, 8 Drawing Sheets

(56) References Cited

U.S. PATENT DOCUMENTS

| | | |
|---|---|---|
| 2014/0055777 A1 | 2/2014 | Archambault et al. |
| 2014/0348501 A1 | 11/2014 | Bao et al. |
| 2016/0099851 A1* | 4/2016 | Archambault ...... H04J 14/0212 398/16 |
| 2017/0346591 A1* | 11/2017 | Chedore ............ H04Q 11/0005 |
| 2019/0097719 A1 | 3/2019 | Chedore et al. |
| 2019/0101447 A1 | 4/2019 | Pei et al. |
| 2019/0238251 A1 | 8/2019 | Chedore et al. |
| 2020/0007262 A1 | 1/2020 | Chedore et al. |
| 2020/0228197 A1 | 7/2020 | Bhatnagar et al. |

* cited by examiner

| CV SCANNING MODE | AVERAGE REFRESH TIME WITH 1:32 WSS BASED ROADMs | | | COMMENTS |
|---|---|---|---|---|
| | 4D NODE | 8D NODE | 16D NODE | |
| Conventional Method | 25 mins | 25 mins | 25 mins | Due to lack of results summary, need to wait up to 34 minutes after making a connection to be guaranteed that CV has completed. |
| Full Node, Optimized Method | 15 mins | 13 mins | 9 mins | Times indicated are for "known good" connections (IL < 6dB). Higher loss connections would still take 25 minutes on average to refresh. |
| Skip Non-Provisioned Ports Method | 0.5 mins | 2.1 mins | 8.5 mins | Requires link provisioning / ZTP to skip unused ports. Full node scan required to discover if unused port has been connected by mistake. |
| Skip Non-Loopback Ports Method | 1 min | 2.4 mins | 8.5 mins | Requires loopback connectors at card faceplate so that CV switch can auto-discover which ports are to be skipped. Does no rely on link provisioning. |
| Troubleshooting Method | < 10 secs | < 10 secs | < 10 secs | CV runs on a single MPO cable being serviced. |

REDUCING CONNECTION VALIDATION (CV) TIME IN AN OPTICAL NODE

TECHNICAL FIELD

The present disclosure generally relates to optical networking systems and methods. More particularly, the present disclosure relates to running Connection Validation (CV) scans that are focused on specific communication cables subsequent to these communication cables being connected or reconnected in a Reconfigurable Optical Add/Drop Multiplexer (ROADM) of an optical network.

BACKGROUND

When network elements (e.g., ROADM nodes) are deployed in an optical communication network, CV methods may normally be performed to verify the inter-degree and/or add/drop-to-degree fiber connections. This verification is performed in order to ensure that the optical fibers are connected to the proper ports and that the measured fiber loss is within expected limits. CV scans may be run in any type of network environment, such as in a full homogeneous network where there is communication between interconnected degrees, in a disaggregated configurations (heterogeneous network) where there is no communication between shelves or interconnected cards, or other suitable types of networks. For example, a homogeneous network may include equipment from the same vendor, thereby having communication between the degrees. On the contrary, a disaggregated configuration may include equipment from different vendors, thereby having no communication.

With a CV scan, a signal source (Tx) is typically implemented per ROADM degree or per channel mux/demux and is configured to cycle through each interconnected fiber transmit port. As described herein, the term "mux" refers to a multiplexer whereas a "demux" refers to a demultiplexer. Also, the Tx source signal is transmitted with a protocol message that uniquely identifies the originating port ID (e.g., the Tx port ID), as well as that port's total output power. On a far end of the ROADM, a receiver (Rx) cycles through each of its receiving ports (Rx ports) to catch the CV packets transmitted from the source end of the ROADM. The receiver (Rx) has to wait (e.g., Rx dwell time) on each port long enough so that it can reliably catch the transmitted packets. This means that, if a ROADM site is built with Wavelength Selective Switching (WSS) and has N number of degrees and add/drop ports, then:

a) for N number of ports, the Rx dwell time would be equal to about N*Tx dwell time, and
b) the total CV cycle time would be equal to about $N^2$*Tx dwell time.

Thus, for a typical Tx dwell time of one second and a typical configuration of N=32 (e.g., for an 1×32 WSS), the CV cycle time would be equal to $32^2$*one second, which is about 17 minutes. During maintenance of an optical network, if optical cables are disconnected and then reconnected, this one CV scan would require about 17 minutes, which, in many situations, is an unacceptably long time.

Additionally, in a typical deployment, however, decoding data over one CV cycle time sometimes provides erroneous outcomes. For example, as a result of limited port-to-port isolation in a WSS, a lower power instance of the signal might be transmitted or received on an unintended port. These unintended signal artifacts may be referred to as "ghosts." To alleviate the ghost packet manifestations, CV implementations may require a second scanning process of all the ports and then picking up the packets from a transmit port appearing with the least amount of losses (or the highest power). Hence, the total CV processing time (or CV cycle time) would be equal to about 17 minutes*2 scan cycles=34 minutes. That means, with existing techniques, if a Multi-fiber Push On (MPO) fiber is disconnected and then reconnected (or during initial installation), the user (e.g., technician, installer, maintenance operator, engineer, network operator, or other users), in order to receive connection validation and fiber loss detection, may be required to wait for two full cycles, which could take over 30 minutes to complete. occur, which is typically considered to be an unacceptable amount of time from the perspective of service and deployment teams.

Since there is usually no coordination between the transmit and receive ends regarding CV scans, it normally takes a long time to scan a single fiber or sub-fiber in a Multi-fiber Push-On (MPO) type of cable. Again, on a typical 1×32 ROADM configuration, it takes about 17 minutes to perform a single scan and can take up to about 34 minutes in a worst case scenario run a second scan to alleviate any ghost packet notifications in the ROADM. Therefore, there is a need in the field of communication networks (e.g., optical networks) to provide CV scanning processes that improve upon the existing strategies and can reduce the overall CV run time to more quickly and efficiently utilize a technician's operations times.

BRIEF SUMMARY

The present disclosure is directed to optical networks and control systems for running Connection Validation (CV) scans on communication cables within a node of the optical networks. More particularly, the control systems as described in the present disclosure are configured to run the CV scans after an optical cable (or Multi-fiber Push-On (MPO) connector cable) is inserted into a node (e.g., Reconfigurable Optical Add/Drop Multiplexer (ROADM)) of the optical network. Normally, conventional CV scans may be designed to run continuously to constantly check that the optical cables are connected properly to allow the ROADM to communicate with other components in the optical network in a satisfactory manner.

According to one embodiment of the present disclosure, a controller (configured to manage CV processes in a portion of a network) may include an interface configured to interact with a network node arranged in the portion of the network. The controller may also include a processing device in communication with the interface and a memory device in communication with the processing device. The memory device may be configured to store a computer program having instructions that, when executed, enable the processing device to receive a request to perform a focused CV on one or more communication cables after the one or more communication cables are physically connected or reconnected into the network node arranged in the portion of a network. In addition, the instructions further enable the processing device to interrupt an ongoing CV running in the portion of the network and execute the focused CV to target a CV scan on the one or more communication cables.

According to another embodiment of the present disclosure, a method may include the step of receiving a request to perform a focused CV on one or more communication cables after the one or more communication cables are physically connected or reconnected into a portion of a network. The method may also include the steps of interrupting an ongoing CV running in the portion of the network and executing the focused CV to target a CV scan on the one or more communication cables.

According to yet another embodiment of the present disclosure, a non-transitory computer-readable medium may be configured to store computer logic for performing CV scans. The computer logic may include instructions that are configured to enable a processing device to receive a request to perform a focused CV on one or more communication cables after the one or more communication cables are physically connected or reconnected into a portion of a network. The computer logic may further include instructions configured to enable the processing device to interrupt an ongoing CV running in the portion of the network and execute the focused CV to target a CV scan on the one or more communication cables.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 9 is a chart illustrating expected times for running the various CV scans on the ROADM of FIG. 1, according to various embodiments of the present disclosure.

DETAILED DESCRIPTION

Figure 1:
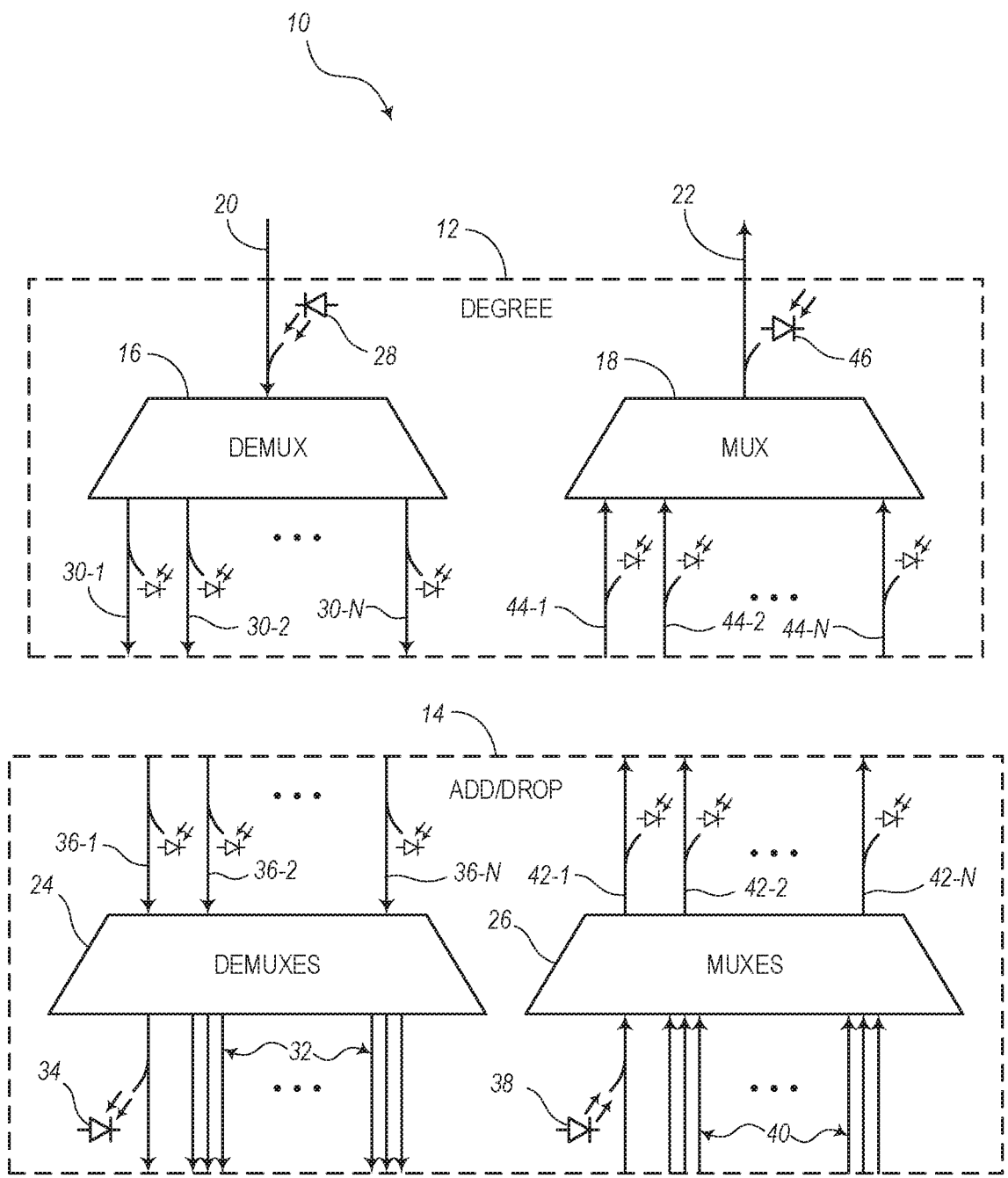
FIG. 1 is a schematic diagram illustrating at least a portion of a Reconfigurable Optical Add/Drop Multiplexer (ROADM) within which various types of Connection Validation (CV) scans may be executed, according to various embodiments of the present disclosure.

The present disclosure relates to systems and methods for controlling CV processes within a network element or node of a communication system (e.g., optical network). As mentioned above, typical CV scans may be run in the node to check the validation of connections to ensure that cables are linked to the proper ports and that the signal loss across the cables is within acceptable tolerances. These typical CV scans may normally run on an ongoing or continuous basis. However, as mentioned above, each CV scan may require an unacceptably large amount of time to complete. Therefore, the embodiments of the present disclosure are configured to perform other specific types of CV scans that can be more efficient to thereby complete the CV processes in a fraction of the normal processing times for conventional CV scans.

In particular, the embodiments of the present disclosure are configured to detect when one or more communication cables (e.g., Multi-fiber Push-On (MPO) connector cables) are newly installed in a node of an optical network or have been disconnected for maintenance purposes (e.g., for dusting or cleaning the cables) and then reconnected again within the nodes. It may be important at this time to determine that the cables are properly installed back into the node such that the connectors properly engage the corresponding connectors on the node and that the cables are plugged into the correct ports. For example, a CV scan may be run after maintenance, such as after detection of a bad connection, misconnection, high fiber loss, or other similar problem A technician may remove a MPO cable to clean it up, but once the MPO cable is reinstalled, the technician may be required to wait up to 34 minutes just to see if the cable is correct or not, which is normally unacceptable in this situation.

Therefore, the embodiments of the present disclosure are configured to focus a new CV scan on the particular cable or cables that have just been reconnected, reattached, or reinstalled. Thus, subsequent to reconnection, the CV techniques described in the present disclosure may be run to provide the benefit of a reduced CV processing time among other benefits as will be recognized by one or ordinary skill in the art having an understanding of the spirit and scope of the embodiments of the present disclosure.

With Reconfigurable Optical Add/Drop Multiplexer (ROADM) nodes deployed in an optical network, CV methods are configured to verify the fiber connections between degrees and/or fiber connections between a degree and an add/drop device. The CV methods are configured to verify or ensure that the fibers are connected to the proper ports and the measured fiber loss is below a predetermined threshold. The ROADM nodes may be deployed in networks having either a homogeneous or disaggregated (heterogeneous) configuration.

The embodiments of the present disclosure are configured to run different types of CV scans that differ from conventional CV methods. For example, the present embodiments do not cycle through every Tx port and every Rx port, as is normally done in the conventional systems. Instead, the embodiments described herein use a more judicious approach whereby CV scanning before Tx ports and Rx ports can be focused or targeted to just the cables that may need to be checked. In other words, if certain cables remain unchanged during a maintenance procedure, there is no immediate need to recheck the connection for these cables. However, after one or more cables have been reconnected in the network, the embodiments of the present disclosure may detect this recent reconnection status (or may receive a request from an operator to check these cables). Then, one or more of the focused or targeted CV scans described herein may be executed to check the connectivity and signal loss of just these cables.

Also, some of the embodiments of the present disclosure may be configured to utilize a leader/follower approach, which further distinguishes from the conventional systems that may be designed with no unique identifier for a shelf or chassis. In the leader/follower approach, an identifier may be used among the interconnected degrees or add/drop shelves. Also, the present disclosure provides a centralized controller that can coordinate CV actions between the shelves. Furthermore, the present embodiments may include a dependency on a single ROADM degree or node element (e.g., a centralized dependency on a specific Fiber Interconnect Module (FIM) as described in some implementations).

Conventional asynchronous CV implementation may assume that a network includes fully populated MPO ports and includes a disaggregated configuration where there is no communication between shelves. However, this is not always the case for many deployed ROADM configurations. The present disclosure takes advantage of the presence of any inter-shelf communication between any interconnected degree or add/drop shelves and detects partial fill degree connections to reduce the total CV cycle time.

Several example methods are presented in this disclosure to address the reduction of CV cycle time. For example, one implementation may include detecting Tx ports that are unused or already in service (e.g., already carrying traffic signals) and does not transmit on those unused or in-service Tx ports. Another implementation may include detecting unused or in-service Rx ports and avoiding CV scans through them. Yet another implementation may include populating unused ports with loopback connectors so that a network card can quickly and independently determine which ports are unused.

These and other implementations include techniques to reduce Rx dwell time (which is a function of the number of Tx ports and the Tx dwell time) and further includes sending additional Tx information via the transmit protocol message, whereby the additional information may include the number of Tx ports in use, the Tx dwell time, the total Tx scanning time, among other parameters. In addition, the "ghost signal detection," which filters out false connections due to WSS crosstalk, are further optimized to identify "known good connections" immediately, rather than waiting until the end of the full CV cycle. With the systems and methods described herein, a typical four-degree connected ROADM node may be expected to take only about one minute to scan to provide a summary CV report for all interconnected ports. Also, a specific MPO port (and all of its sub-fibers) after repair/maintenance can be examined in less than 10 seconds by the present systems and methods, compared to conventional methods that may take up to about 34 minutes.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of embodiments which are illustrated in the accompanying drawings.

FIG. 1 is a schematic diagram illustrating an embodiment of portions of a Reconfigurable Optical Add/Drop Multiplexer (ROADM) 10 that is employed as an optical node in an optical network. In the ROADM 10, as with other types of optical nodes, various types of Connection Validation (CV) techniques may be used for scanning the node in order to determine if the connections within the node are acceptable. As shown in FIG. 1, the ROADM 10 includes at least one degree component 12 (e.g., a Wavelength Selective Switching (WSS) component) and at least one add/drop component 14. The degree component 12 includes a demultiplexer 16 for receiving optical signals along a single ingress path 20 at a specific degree and a multiplexer 18 for transmitting optical signals along a single egress path 22 at the specific degree. The add/drop component 14 includes demultiplexers 24 and multiplexers 26 for removing (dropping) and adding optical channels according to normal ROADM operations. According to other embodiments, the ROADM may include multiple degrees and multiple add/drop components.

In addition to typical ROADM adding and dropping processes, CV scans are also run to check the connectivity throughout the ROADM 10. To run a CV scan, a CV source 28 (Tx) inserts CV scan signals that cycle through the output ports 30-1, 30-2, . . . , 30-N of the demultiplexer 16. The CV source 28 may be photodiode for providing a light signal containing information for the CV test. Each output port 30 is associated with a corresponding demultiplexer of one of the demultiplexers 24 of the add/drop component 14. In this way, each CV signal from a respective output port 30 is applied to the sets of output ports 32 of the demultiplexers 24. Each of the demultiplexers 24 includes a CV receiver 34 (Rx) for receiving the CV signals from the CV source 28. The CV source 28 transmits the CV signals using a protocol that uniquely identifies the originating port IDs of the respective output ports 30-1, 30-2, . . . , 30-N. Also, the CV protocol includes embedding the output power at the respective output port 30 in the CV signal. The ROADM CV signal power may be for dark fibers only or may include ROADM CV+traffic signal power otherwise.

Each of a plurality of CV receivers 34 (e.g., photodiodes) cycles through the respective input ports 36-1, 36-2, . . . , 36-N and dwells long enough on any given port such that it will capture the CV scan signal from the CV source 28 as it cycles at the add/drop end of the ROADM 10. The first CV receiver 34 is also configured to decode the originating port ID and the originating Tx power and may then compare this information to expected adjacencies and inter-pack losses. With N ports (i.e., N output ports 30 and N input ports 36), the amount of time that the first CV receiver 34 scans for signals, which may be referred to as "dwell time," may be estimated by the following:

$$Rx\_dwell\_time = \sim N * Tx\_dwell\_time$$

where Tx_dwell_time is the amount of time that each output port 30 continues to transmit to ensure that each input port 36, in sequence, has a chance to check connectivity (if any) thereto. Thus, the following defines the total time that it takes to perform the CV scan:

$$\text{Total CV cycle time} = \sim N^2 * Tx\_dwell\_time$$

As an example, if the Tx_dwell_time is equal to one second and N=32, the Total CV cycle time will be about 17 minutes.

Also, the ROADM 10 includes a set of CV sources 38 configured for each multiplexer of the multiplexers 26. In a similar procedure, the CV sources 38 apply CV scans in sequence to multiple sets of input ports 40 for multiple multiplexers. These CV scans are applied to respective output ports 42-1, 42-2, . . . , 42-N of the multiplexers 26 and transmitted to input ports 44-1, 44-2, . . . , 44-N of the multiplexer 18. An egress port of the multiplexer 18 is associated with a CV receiver 46 configured to decode the CV signals from each of the CV sources 38 transmitted in a direction from the add/drop component 14 to the degree component 12, which is the opposite direction with respect to the first CV scan from the CV source 28 of the degree component 12 to CV receivers 34 of the add/drop component 14.

Proposed High-Level Method

As suggested above, it may be unacceptable for a technician to be required to wait 17 minutes or longer for a CV scan to run during maintenance of an optical node. Therefore, in order to reduce the Total CV cycle time, different approaches are proposed in the present disclosure, each of which may reduce the cycle time by different amount. Each of the techniques described in the present disclosure may be advantageous over conventional methods, although some may be able to reduce the processing time more significantly.

It has been noted that conventional asynchronous CV implementations may typically assume fully populated Multi-fiber Push-On (MPO) ports and a disaggregated architecture where there is no communication between shelves. However, if inter-shelf communication is available, one implementation of the present disclosure includes taking advantage of this communication and allow the ports to be only partially filled, according to the actual need. As such, the Total CV cycle time can be reduced by eliminating one or more unnecessary steps. For example, the cycle time can be reduced by:

1) not transmitting to unused or in-service Tx ports;
2) not scanning unused or in-service Rx ports;
3) reducing the Rx dwell time, which is a function of the number of Tx ports and the Tx_dwell_time; and/or
4) optimizing the "ghost channel algorithm," which filters out false connections due to WSS crosstalk to identify "known good connections" immediately, rather than wait until the end of a full CV cycle.

Traditionally, CV pass/fail may be inferred by the presence or lack of alarms. A complementary objective to the performance improvements in the present disclosure may be to provide a consolidated summary (including last scanned time-stamps) for better usability in interpreting results.

Some of the challenges to be overcome by the proposed techniques may include the case where there may be no site master shelf, so that any synchronization may need to be done via a peer-to-peer communication. Also, since there is no centralized coordinator, providing a consolidated site summary may be more challenging. Furthermore, knowledge about whether each port is actually used or not may be based on provisioning, and thus there could be a corner case blind spots if physical install is misaligned with provisioning.

Figure 2:
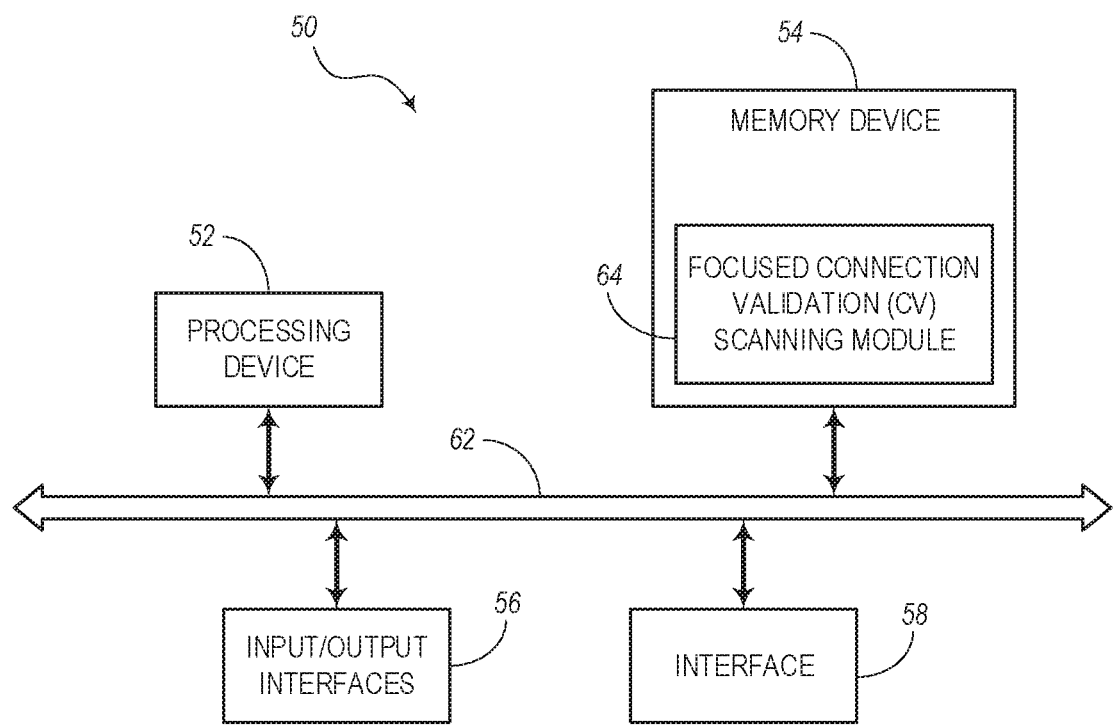
FIG. 2 is a block diagram illustrating a controller for executing CV scans in the ROADM of FIG. 1, according to various embodiments of the present disclosure.

FIG. 2 is a block diagram illustrating an embodiment of a controller 50 for executing CV scans in an optical node, such as the ROADM 10 of FIG. 1. In the illustrated embodiment, the controller 50 may be a digital computer that, in terms of hardware architecture, generally includes a processing device 52, a memory device 54, Input/Output (I/O) interfaces 56, and an interface 58. The memory device 54 may include a data store, database, or the like. It should be appreciated by those of ordinary skill in the art that FIG. 2 depicts the controller 50 in a simplified manner, where practical embodiments may include additional components and suitably configured processing logic to support known or conventional operating features that are not described in detail herein. The components (i.e., 52, 54, 56, 58) are communicatively coupled via a local bus 62. The local bus 62 may be, for example, but not limited to, one or more buses or other wired or wireless connections. The local bus 62 may have additional elements, which are omitted for simplicity, such as controllers, buffers, caches, drivers, repeaters, receivers, among other elements, to enable communications. Further, the local bus 62 may include address, control, and/or data connections to enable appropriate communications among the components 52, 54, 56, 58.

The processing device 52 is a hardware device adapted for at least executing software instructions. The processing device 52 may be any custom made or commercially available processor, a Central Processing Unit (CPU), an auxiliary processor among several processors associated with the controller 50, a semiconductor-based microprocessor (in the form of a microchip or chip set), or generally any device for executing software instructions. When the controller 50 is in operation, the processing device 52 may be configured to execute software stored within the memory device 54, to communicate data to and from the memory device 54, and to generally control operations of the controller 50 pursuant to the software instructions.

It will be appreciated that some embodiments of the processing device 52 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 52 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 56 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 56 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The interface 58 may be used to enable the controller 50 to communicate with and interact with a network node or device (e.g., ROADM 10) or to communicate over a network, such as an optical network that includes the ROADM 10 or other network (e.g., the Internet, a Wide Area Network (WAN), a Local Area Network (LAN), etc.). The interface 58 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The interface 58 may include address, control, and/or data connections to enable appropriate communications on the network.

The memory device 54 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 54 may incorporate electronic, magnetic, optical, and/or other types of storage media. The memory device 54 may have a distributed architecture, where various components are situated remotely from one another, but can be accessed by the processing device 52. The software in memory device 54 may include one or more software programs, each of which may include an ordered listing of executable instructions for implementing logical functions. The software in the memory device 54 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 54 may include a data store used to store data. In one example, the data store may be located internal to the controller 50 and may include, for example, an internal hard drive connected to the local bus 62 in the controller 50. Additionally, in another embodiment, the data store may be located external to the controller 50 and may include, for example, an external hard drive connected to the Input/Output (I/O) interfaces 56 (e.g., SCSI or USB connection). In a further embodiment, the data store may be connected to the controller 50 through a network and may include, for example, a network attached file server.

Moreover, some embodiments may include a non-transitory computer-readable storage medium having computer readable code stored in the memory device 54 for programming the or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 52 that, in response to such execution, cause the processing device 52 to perform a set of operations, steps, methods, processes, algorithms, functions, techniques, etc. as described herein for the various embodiments.

According to some embodiments, the controller 50 may include a focused Connection Validation (CV) scanning module 64. In some embodiments, the focused CV scanning module 64 may be implemented as software and stored in the memory device 54. In other embodiments, the focused CV scanning module 64 may be implemented, at least partially, as hardware and configured as an ASIC or other hardware element and operated by the processing device 52. According to other embodiments, the focused CV scanning module 64 may include any combination of hardware, software, and/or firmware and include computer logic or instructions for enabling the processing device 52 to perform various CV scanning functions.

In particular, the focused CV scanning module 64 may enable the processing device 52 to perform a CV scan that is focused only on certain ports, while avoiding other unused or currently-active ports. By avoiding these ports, it is possible to significantly reduce the CV scan time for a technician or troubleshooter. In some embodiments, the focused CV scanning module 64 may be configured to include logic that includes receiving a request to perform a focused CV for targeting a CV scan on one or more communication cables after these cables have recently been physically connected to reconnected to a portion of a network. In response to this request, the focused CV scanning module 64 may include interrupting any ongoing CV methods that may be continuously running in this portion of the network. Also, the instructions of the focused CV scanning module 64 may further include executing the focused CV on just the one or more communication cables. Upon completion of the focused CV, the focused CV scanning module 64 may be configured to allow the interrupted CV methods to resume again, having been interrupted by the focused CV scan.

Focusing a CV Scan on a Targeted MPO Cable

Figure 3:
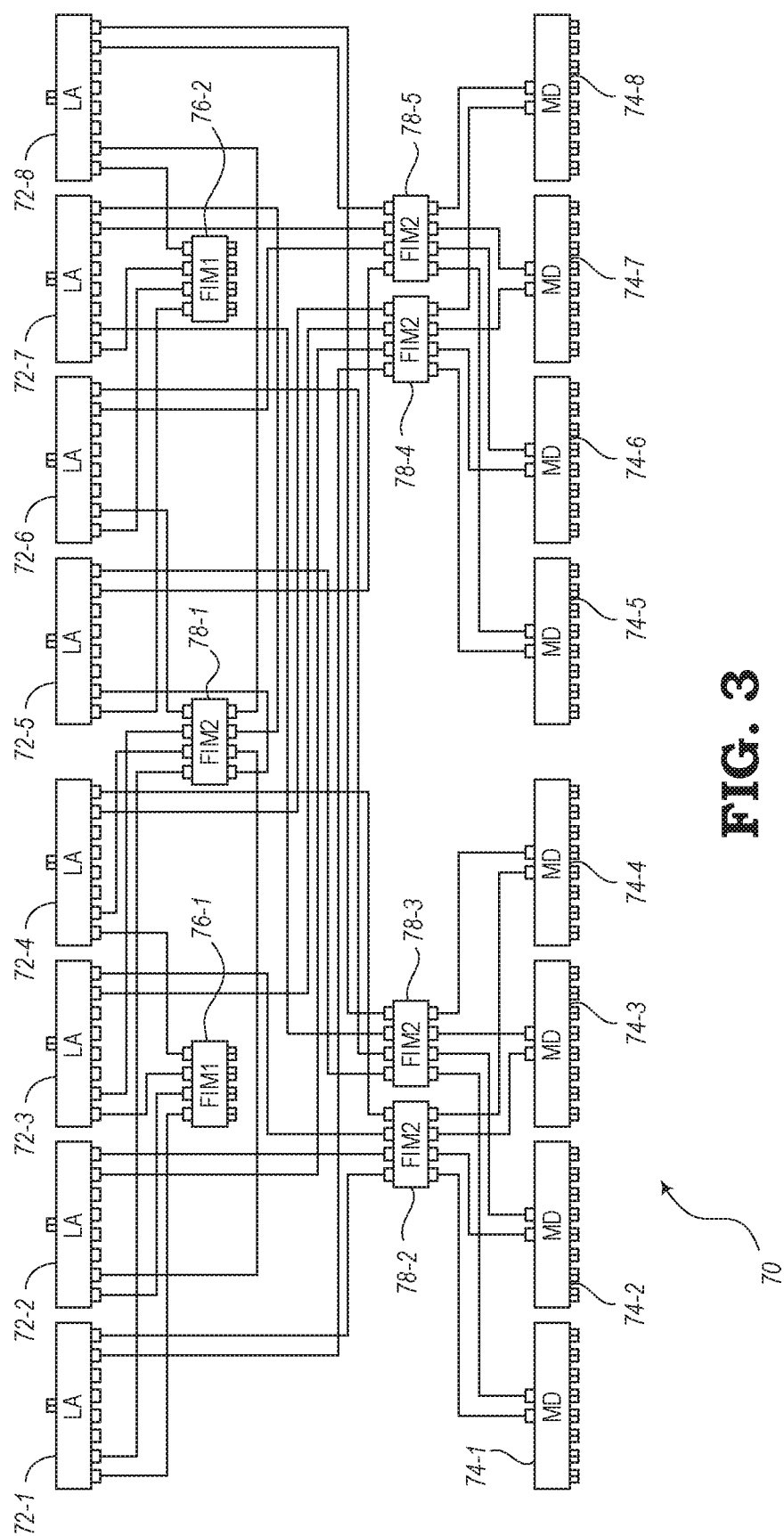
FIG. 3 is a schematic diagram illustrating a section of the ROADM of FIG. 1 for focusing a CV scan on a targeted Multi-fiber Push-On (MPO) of the ROADM, according to various embodiments of the present disclosure.

FIG. 3 is a schematic diagram illustrating an embodiment of a section 70 of the ROADM 10 of FIG. 1. In this embodiment, the section 70 is shown to emphasize a process for performing a focused CV scan on a targeted Multi-fiber Push-On (MPO) of the ROADM 10. For example, the focused CV scan may be run after a maintenance event (e.g., repair that involves removing and reconnecting an MPO). The section 70, according to this example arrangement, includes eight Line Amplifier (LA) components 72-1, 72-2, . . . 72-8 configured to communication with eight Multiplexer/Demultiplexer (MD) components 74-1, 74-2, . . . , 74-8.

The LA components 72 may be configured with one input and 32 outputs (1×32) or other suitable I/O arrangement. The LA components 72 may be C-band modules or C+L-band modules with double width and single height. Also, the LA components 72 may be configured with a flexible grid WSS, dual-line EDFA, bi-directional OTDR, integrated ASE, optical channel monitoring, and Optical Service Channel (OSC) for high port count ROADM applications. The MD components 74 may be configured as circuit packs with eight inputs and 24 outputs (8×24), 8×16, or other suitable I/O arrangement. The MD components 74 may be C-band modules or C+L-band modules with single width and double height. The MD components 74 may have twin contentionless WSSs for interconnecting add/drop channels to any of eight degrees for ROADM applications.

Connections between the LA components 72 and MD components 74 may include MPO connector cables, which may include Fiber Interconnect Modules (FIMs) A FIM is a module that includes fixed cable connections and is used to reduce the cabling complexity in the ROADM 10. A first type of FIM (FIM1) 76-1, 76-2 is used for connection to four ports of the LA components 72. A second type of FIM (FIM2) 78-1, 78-2, 78-3, 78-4, 78-5 is used for connection to eight ports of the LA components 72 and MD components 74.

The FIMs may function as an intermediate connector and may be referred to as a "shuffler" in some environments. For instance, each FIM may have four sub-fiber pairs within each cable and the cables are used to simplify the connection with a large number of ports. The four sub-fiber pair may connect to different components or circuit packs and can be split up and redistributed as needed. A FIM may be passive module that is used for providing connections. The FIM is primarily utilized for creating a more organized interconnection structure as opposed to disorganized spaghetti interconnections. The FIM1s 76 may be configured to interconnect up to four degrees via MPO cables. The FIM2s 78 may be configured to use MPO cables to interconnect a group of four degrees to another group of four degrees or to connect the group of four degrees to add/drop interconnections between LAs and MDs.

According to one example of user provisioning of the section 70, Mode=Focused+MPO identifier. The query results may occur "instantly" in the CV Rx objects (e.g., MD components 74) or site summary. In one embodiment, the LA component 72-2 may be referred to as a "leader" (or may alternatively be referred to as a "master," "primary," etc.) component and the first four MD components 74-1, 74-2, 74-3, and 74-4 may be referred to as "follower" (or may alternatively be referred to as a "slave," "secondary," etc.) components.

In some embodiments, a user (e.g., technician, installer, maintenance person, etc.) may specify a single MPO that is undergoing maintenance. This particular identification of an MPO may be interpreted by the present systems as an indication that the specific MPO is to be handled in a certain way such that the CV scan can be focused just on this one MPO. One objective in this case is for the user to verify the connectivity of the MPO to the right port. Also, another objective is to determine whether or not the measured fiber loss on both transmit and receive directions after being serviced does not exceed a certain predetermined threshold.

The involved nodes may be configured to automatically form a "leader/follower" (or master/slave) formation using peer-to-peer messaging. For example, a single MPO cable can typically accommodate six fiber pairs where five pairs can be used for degree connections to five different nodes, and one pair is used for CV communication. In other words, when an MPO port is identified as the focus of inspection in the CV scan, the transmit node (e.g., LA component 72-2) will be the leader that will communicate with five other downstream nodes to enter a "listening" mode for the followers (e.g., MD components 74).

A Core Transport Manager (CTM) device (with a specific MPO under maintenance) becomes the "leader" and signals other shelves to enter a "follower" mode which stops autonomous Tx/Rx scanning. At the leader shelf, the CTM device configures a Tx and Rx port-sequence to only scan sub-ports associated with the MPO undergoing maintenance. Follower shelves may be configured to determine which ports to focus on based on the leader shelf sub-fiber link provisioning and to focus their Tx and Rx ports toward the leader MPO under maintenance using the port-sequence.

The CV method in this embodiment can be applied to homogeneous and/or disaggregated nodes. For homogeneous nodes with communications between interconnected shelves, messaging between nodes may be transported via internal device communications. For disaggregated nodes, additional information may be inserted on the CV packets to signal a far-end node to enter into a "follower" mode and focus only on Tx/Rx ports where the "follower" indication is received. This mode may be invoked after CV discovery has run at least once to discover all the site neighbors.

The MD components 74 at the bottom of FIG. 3 may represent two sets of four circuit packs that correspond with and are connected to one of the four LA components 72 in a first or second set shown at the top of FIG. 3. Connections are arranged such that each MD component 74 is able to reach the four corresponding LA components 72. This connectivity is done by splitting and reassembling.

The FIM1s 76 and the FIM2s 78, as represented as multiple boxes in FIG. 3, may actually be arranged within a single box and may be designed for multiple groups of connectivity. For example, with a four-degree node, the node may be arranged with FIM1s 76 only to handle up to four degrees. As shown in the eight-degree (8D) node (e.g., section 70) of FIG. 3, FIM1s 76 and FIM2s 78 may be needed for more than a four-degree node. The FIM2s 78 can be installed to create a block so four degrees can be interconnected with another four degrees via the FIM1s 76 and/or FIM2s 78. The FIM1s 76 and FIM2s 78 may have different functions. For example, the FIM1s 76 may be configured to connect four elements amongst themselves, where the FIM2s 78 may be configured to connect four elements with four different elements.

A user (e.g., technician, installer, engineer, or other operator in the field of optical networks) may need to disconnect one or more MPOs on a periodic basis to clean them up. Then, when the MPOs are reconnected, the continuous CV scan would normally be used to check that the interconnections are proper. However, the embodiments of the various systems and methods of the present disclosure are configured to accelerate the CV testing by focusing a new type of CV scan just on the one or more MPOs that have been reinstalled. Thus, the CV scan time can be significantly reduced to test the immediately reinstalled connectors that the connections are good and the ports are properly matched up according to the intended design. In the example shown in FIG. 3, one MPO connector cable may be connected to four different degrees (e.g., LA components 72) or four different downstream add/drop components (e.g., MD components 74). The CV test in this case can verify that the connections of the immediately installed (or reinstalled) MPO cable are good.

In an environment where the optical network is arranged with a homogeneous platform, where communication is possible with downstream shelves/nodes (regardless of who manufactured each independent shelf/node), the focused CV as described in this example can be executed without dependency on inter-node or inter-shelf communication (even without a master/slave combination). A user may request a CV scan on the newly reconnected cable. In this case, the control systems of the present disclosure (e.g., controller 50) may be configured to notify downstream nodes/shelves that a special CV process is planned and that the downstream components should listen for specific CV signals. Essentially, this process dynamically creates or establishes a leader/follower (master/slave) arrangement. The request for such a special CV scan includes instructing the downstream components to stop a normal CV scanning process and immediately focus attention on one or more of the new CV techniques (e.g., the process described with respect to FIG. 3).

Thus, the new CV interrupts (or preempts) the full 34-minute scan to run the rapid CV scans described herein. Temporarily, the leader (e.g., LA 72-2) may preempt a full scan and scan only those four ports that are relevant to the MPO that is under maintenance. Then, the LA 72-2 in this case may broadcast that an alternative CV has been entered such that the follower components (e.g., MD components 74-1, 74-2, 74-3, 74-4) are notified that the leader has entered this state. In response, the followers preempt their full scans and only focus on the single port that is connected back to the leader. When this operation is done, the leader (e.g., LA component 72-2) may switch back to the regular full CV mode by removing the initial interruption signal (or unblocking the preemption) to allow the various involved components to resume with their normal scans. It should be noted that the leader may be either a degree component or an add/drop component and the follower may be either a degree component or an add/drop component.

This focused CV scanning can be performed in completely disaggregated or full homogeneous configurations. If multiple MPO connector cables are removed and reinstalled at about the same time, the focused CV scanning may run for each of the MPO cables in a serialized manner (i.e., one at a time).

Figure 4:
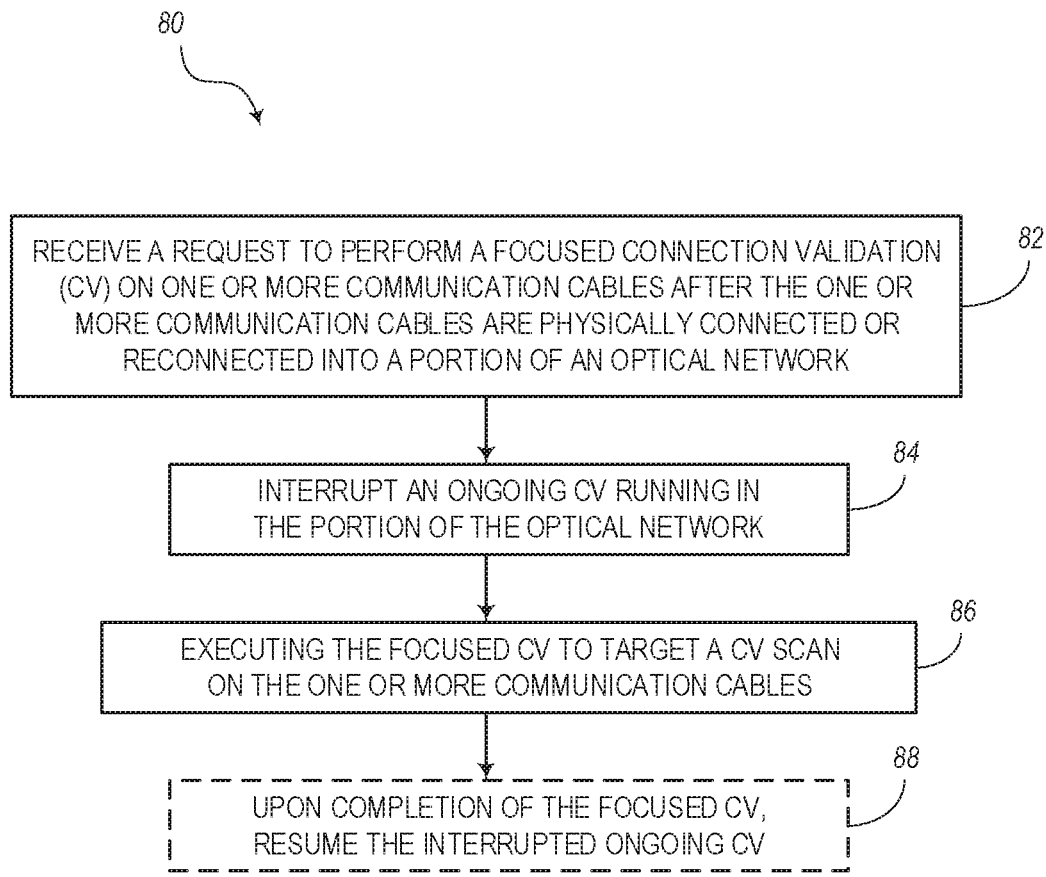
FIG. 4 is a flow diagram illustrating a process for performing a CV scan focused on an MPO of a ROADM, according to various embodiments of the present disclosure.

FIG. 4 is a flow diagram illustrating an embodiment of a process 80 for performing a CV scan that is focused on an MPO of a ROADM. The process 80 may include instructions embodied in the focused CV scanning module 64 shown in FIG. 2 for enabling the processing device 52 to perform a focused CV scanning procedure. In this embodiment, the process 80 includes a first step of receiving a request to perform a focused CV on one or more communication cables after the one or more communication cables are physically connected or reconnected into a portion of an optical network, as indicated in block 82. The process 80 also includes interrupting an ongoing CV running in the portion of the optical network, as indicated in block 84, and executing the focused CV to target a CV scan on the one or more communication cables, as indicated in block 86.

Block 82 may include targeting the CV scan on the one or more communication cables after the one or more communication cables are physically connected or reconnected into a network node arranged in a portion of a network. In an optional step, the process 80 may further include resuming the ongoing CV that had been interrupted after the focused CV is complete, as indicated in block 88. The process 80 may execute the focused CV procedure, according to some embodiments, to reduce a cycle time compared with the ongoing CV. The focused CV and the ongoing CV may include transmitting a CV packet from a transmitter (Tx) to a receiver (Rx), wherein the CV packet may include one or more of a number of Tx ports in use, a Tx dwell time, a total Tx scanning time, and a Rx port identifier.

According to some embodiments, the network node may be a ROADM (e.g., ROADM 10, section 70, etc.). Each of the one or more communication cables may be physically connected or reconnected between a first component of the ROADM and a second component of the ROADM. The first component may be a degree component (e.g., degree component 12, LA component 72, etc.) and the second component may be either a degree component or an add/drop component (e.g., add/drop component 14, MD components 74, etc.). The connecting (or reconnecting) of the one or more communication cables can be configured to create a leader/follower formation, where one of the first or second components is established as a leader and the other of the first or second components is established as a follower. Thus, the degree components can be either a leader or a follower and the add/drop components can be either a leader or a follower. The one or more communication cables may include one or more Multi-fiber Push-On (MPO) connector cables. From the perspective of CV, the communication cables are considered to be the same, regardless of whether they are a degree-to-degree connection or a degree-to-add/drop connection.

The process 80 may further include the steps of a) detecting a transmission power at a CV source near one end of the one or more communication cables, b) detecting a reception power at a CV receiver near an opposite end of the one or more communication cables, and c) calculating a signal loss through the one or more communication cables based on the transmission power and reception power. The process 80 may also include executing the focused CV by comparing the signal loss with a predetermined threshold to determine if a connection between the CV source and the CV receiver is acceptable. Also, the process 80 may include skipping a step of checking for other connections in response to determining that the connection is acceptable. The network in which the network node is configured may be a homogeneous network or a disaggregated network.

Process Using Known Good Packets

Figure 5A:
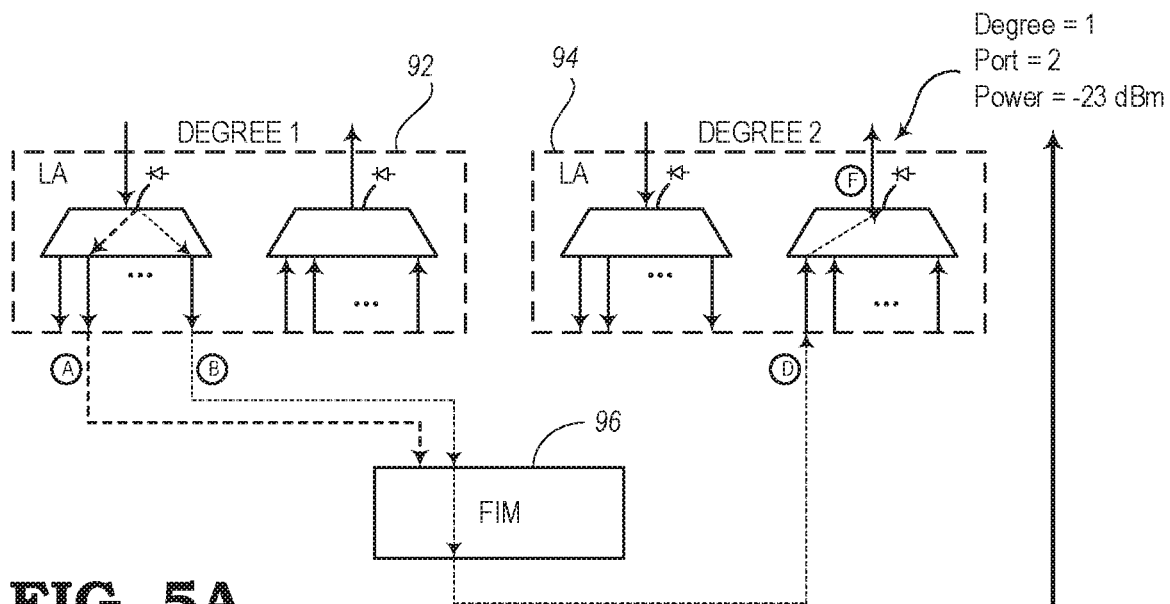
FIGS. 5A and 5B are schematic diagrams illustrating another section of the ROADM of FIG. 1 for executing a full-node, optimized CV scan for avoiding known good connections to reduce CV processing times, according to various embodiments of the present disclosure.
Figure 5B:
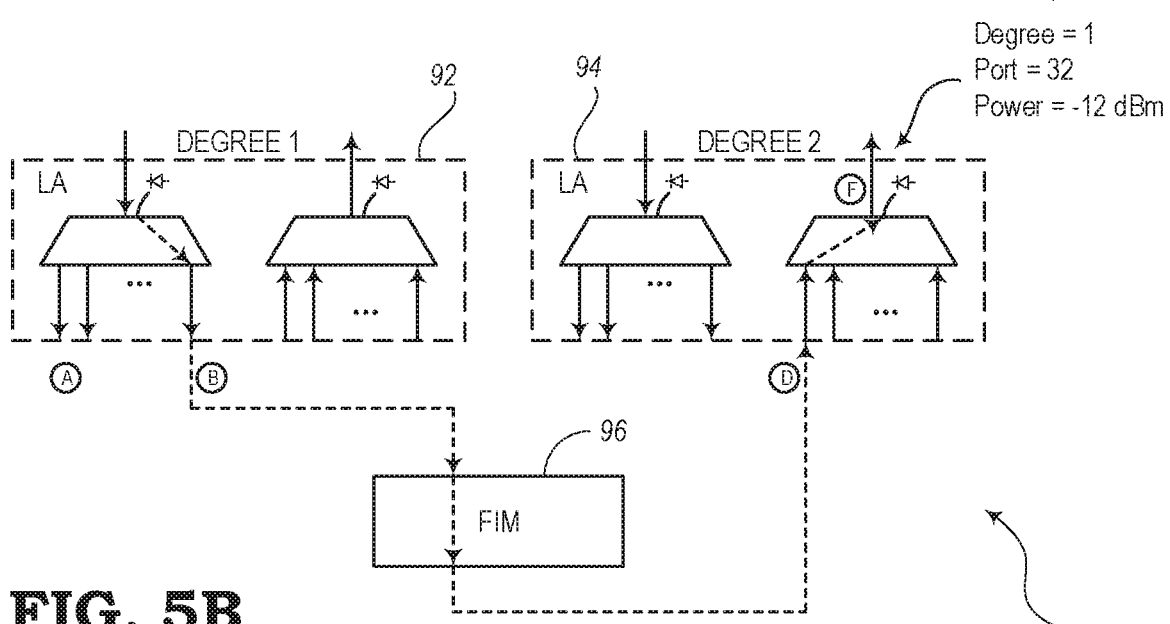

FIGS. 5A and 5B are schematic diagrams illustrating an embodiment of another section 90 of a ROADM (e.g., ROADM 10 of FIG. 1) for executing a full-node, optimized CV scan for avoiding known good connections to reduce CV processing times. The section 90 of the ROADM of FIG. 5 shows LA components 92, 94 at two degrees (e.g., Degree 1 and Degree 2) interconnected via a Fiber Interconnect Module (FIM) 96. For example, according to the embodiment of FIG. 5 and according to other various embodiments described throughout the present disclosure, the FIM 96 may be configured as a photonic module, such as a pluggable Optical Time Domain Reflectometer (OTDR) module, a pluggable amplifier module, a ROADM module, a line interface module, a channel mux/demux module, etc. The FIM 96 may be configured in a reconfigurable line apparatus or system that is built on a packet/optical platform, Optical Transport Network (OTN), switch, router, shelf, chassis, etc.

FIG. 5A shows the section 90A that is utilized in a conventional manner. For example, a CV algorithm may use relative CV Rx power to distinguish between real connections and "ghost channels" due to WSS crosstalk. However, this may require collecting detected packets for all possible Tx/Rx combinations, then selecting the packet with the highest Rx power among all packets sharing the same Tx or Rx port. In the worst case scenario, as mentioned above, it can take nearly two full CV cycles (i.e., 2×17 minutes) to make a final decision. This conventional CV method is run when a new connection is made and when the CV Rx has just switched to the next port.

FIG. 5B illustrates the novel CV algorithm according to the various embodiments of the present disclosure. The section 90B may use an absolute CV Rx power to identify "known good packets." A "known good packets" threshold may be defined by the highest possible ghost power (e.g., max Tx power, min Insertion Loss (IL), min WSS isolation, etc.). Since the connections with an acceptable loss (e.g., less than about 6 to 10 dB) are identified immediately, the present processes can speed up the CV scan by a factor of up to four. As soon as a good connection has been identified, the CV Rx can move on to the next port instead of waiting a fixed dwell time (as is done in conventional algorithms). High loss connections (e.g., greater than about 6 to 10 dB) may still require the full CV cycle.

This embodiment may include performing the speedy CV process when ports are already known to be in service (i.e., carrying traffic). In this case, it may not be necessary to scan again and again, since the arrangement is known. By skipping paths based on what is known, the CV processing time can be reduces by reducing the overall dwell time.

Process of Skipping Non-Provisioned Tx and Rx Ports

Figure 6:
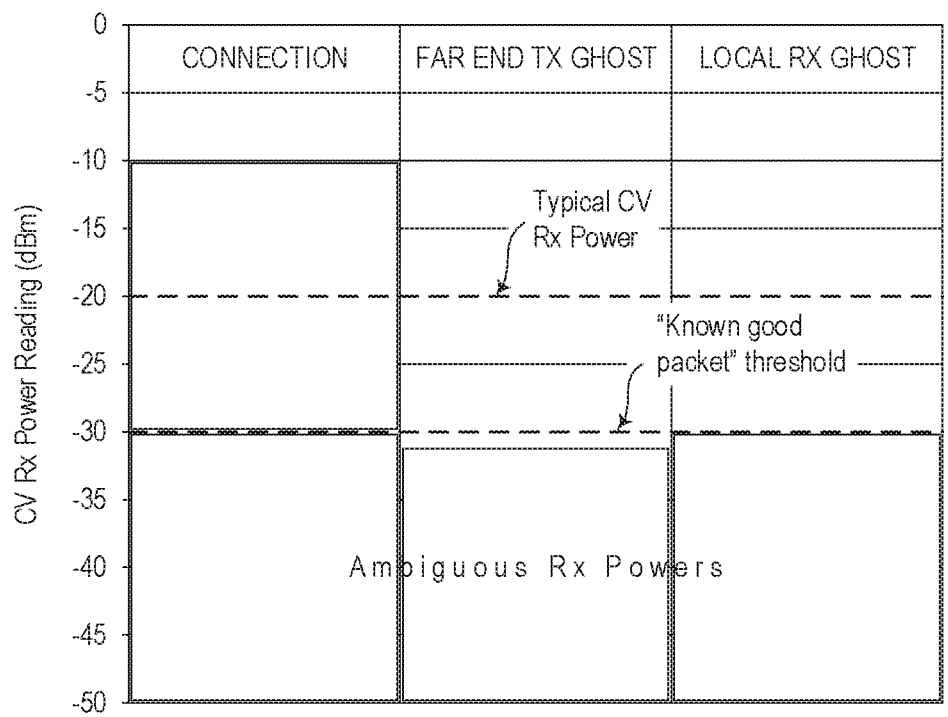
FIG. 6 is a graph illustrating the CV reception power reading related to executing the CV scan with respect to FIG. 5, according to various embodiments of the present disclosure.

FIG. 6 is a graph 100 illustrating the CV reception (Rx) power reading (in dBm) related to executing the CV scan with respect to FIG. 5B. The graph 100 shows "connection," "far end Tx ghost," and "local Rx ghost" portions. Also, the graph 100 includes a typical CV Rx power at about −20 dBm and a known good packet threshold at about −30 dBm. Portions below about −30 dBm may be referred to as "ambiguous Rx powers."

Unused ports (e.g., MPO connectors capped with dust caps) can be skipped based on link provisioning. The process of skipping non-provisioned Tx and Rx ports may include excluding ports without explicit link provisioning from Tx and Rx port scan sequences. Also, link provisioning may be enforced by a user at a degree commissioning time. In addition, ports participating in an MPO with at least one sub-fiber link provisioned would not normally be excluded in these examples. However, fibers in MPOs where no ports have links provisioned can be skipped.

To get the full benefit of skipping ports of the $N^2$ ports, the Rx dwell time can be scaled across the node. This would utilize knowledge of Tx scan characteristics of the cards connected to a given Rx card. In some embodiments, the processes in this example may communicate via a CV protocol the number of Tx ports being scanned and the Tx dwell time. Each card may collect this information from all its neighbors. The worst-case values across all connected cards, in some cases, may be used by a Core Transport Manager (CTM) to derive the Rx dwell time for a given card.

Skip In-Service Ports to Reduce Rx Dwell Time

The card (e.g., switch) may automatically skip Rx ports which have input Loss of Signal (LOS) cleared and have a discovered port-ID. In this state, all the discovered data and timestamps may be latched. The total CV time becomes:

$$(N_{MaxRx} - N_{Loopback} - NIS) \times NTX \times Tx\_dwell\_time,$$

where N is the number of Tx or Rx ports. The process may include clearing latched data if anytime the LOS is raised and returning the data back into scan until the above conditions are met again.

The process may also include skipping Tx ports if a demux switch-out port has LOS cleared and if the far end "received-port-ID" has been received. In this case, some embodiments may include sending the "received-port-ID" as part of the CV transmit packet. If a port sees that the corresponding far-end port has received a packet that it sent, then that transmit switch-out port is considered as "verified" and is skipped from further scanning until a LOS (or an Automatic Power Reduction (APR)) is raised again.

The method of skipping in-service ports may be applicable for both homogeneous and disaggregated solutions if the interconnected degree fiber loss can be measured (internally or externally) based on total power deltas. These measured losses may also be taken into account instead of just relying on CV Tx/Rx power deltas. If the interconnected degree fiber loss cannot be measured, the processes may not be able to skip these in-service ports according to this example.

Transmitting Received Port ID

Figure 7:
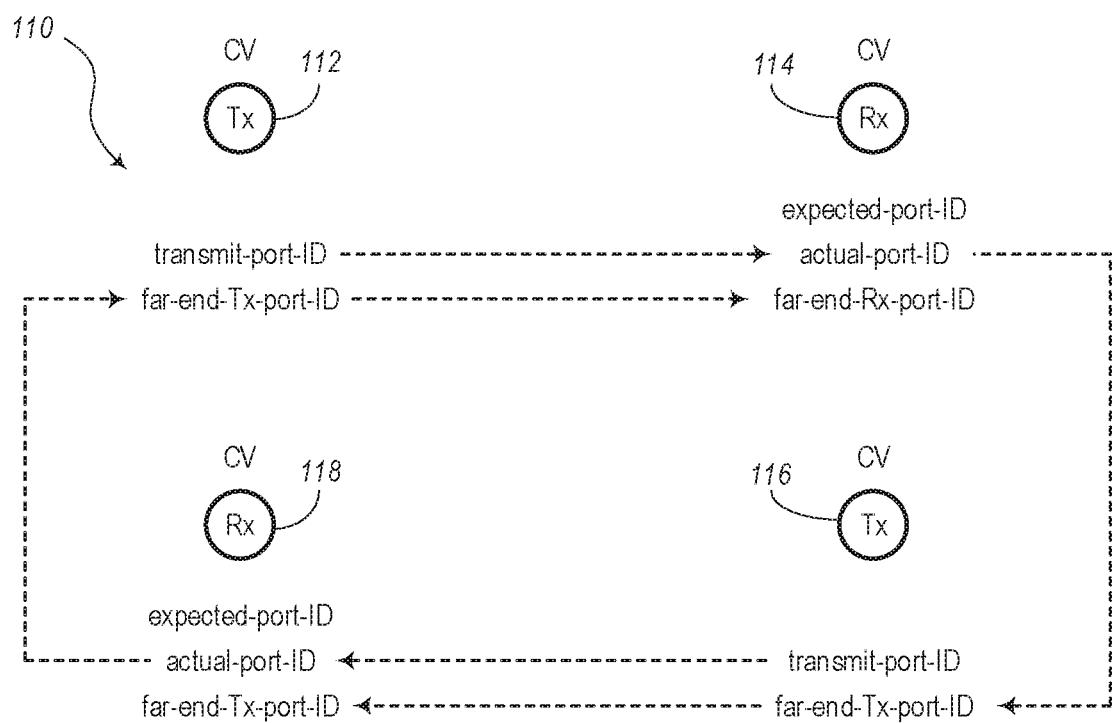
FIG. 7 is a diagram illustrating the transmission of port identification (port ID) with respect another CV scan that involves skipping non-provisioned Tx and Rx ports, according to various embodiments of the present disclosure.

FIG. 7 is a diagram showing an embodiment of a transmission flow 110 of port identification (port ID) messages with respect a CV scan. In this embodiment, the transmission flow 110 may involve skipping non-provisioned Tx and Rx ports. A first CV Tx component 112 may be configured to send a "transmit-port-ID" message to a first CV Rx component 114. The first CV Rx component 114 may include an expected-port-ID, but receives the transmit-port-ID message from the first CV Tx component 112 as an "actual-port-ID." This is sent to a second CV Tx component 116 as a "far-end-Tx-port-ID," which in turn is transmitted to a second CV Rx component 118 as an "actual-port-ID." Also, the second CV Tx component 116 sends a "transmit-port-ID" to the second CV Rx component 118, which has an "expected-port-ID" but receives the "transmit-port-ID" from the second CV Tx component 116 as an "actual-port-ID." This is then sent to the first CV Tx component 112 as a "far-end-Tx-port-ID," which in turn is transmitted to the first CV Rx component 114 as a "far-end-Rx-port-ID." On CTM equipment, if a local transmit-port-ID=far-end-Rx-port-ID, then this may be interpreted as a guaranteed that the local transmit port is connected to far end. This provides an advantage of guaranteeing connections even if the MPO ports are split into LC connections.

Improvements to "Known Good Packets" Algorithm

According to some embodiments, the CV scans may be implemented to provide further improvements to "known good packets" algorithm, if this algorithm is combined with skipping in-service ports (i.e., traffic-carrying ports). Since in-service ports can be skipped from scanning in some cases, then this embodiment may be configured to identify "good packets" based on CV measured fiber loss rather than absolute Rx power, which will give a much higher contrast between real packets and ghost packets. The point in this case is that if there is real traffic going through a node, the CV algorithm could be fooled into thinking that a ghost packet is seeing low fiber loss (or even gain) because the photodiodes would mostly see the signal power. In the absence of a signal, the measured fiber loss will be high (+20 dB) for a ghost packet compared to a real one.

According to one example for performing the known good packets algorithm, a card (e.g., Card A) may have CV Tx switch to port 1, but some light (e.g., about −20 dB) may leak into port 2, which is connected to port 3 of Card B. If there is no traffic, the dark fiber Insertion Loss (IL) detected in Card B will be greater than 20 dB since the CV packet from Card A would contain a value from port 1 (obtained by an optical monitor), whereas an optical monitor for the port 3 of Card B may provide a power that is at least 20 dB lower. If there is traffic, then the readings from the two optical monitors may be dominated by signal power and the calculated fiber loss may be a random number comparing Card A port 1 to Card B port 3. However, with this method, it is possible that the CV processes may be guaranteed to have about 20 dB difference between a real packet and a ghost so that the real packets can be identified, even if the fiber loss is very high (e.g., up to about 15 dB).

Skipping Unused Ports with Loopback Connectors

Figure 8:
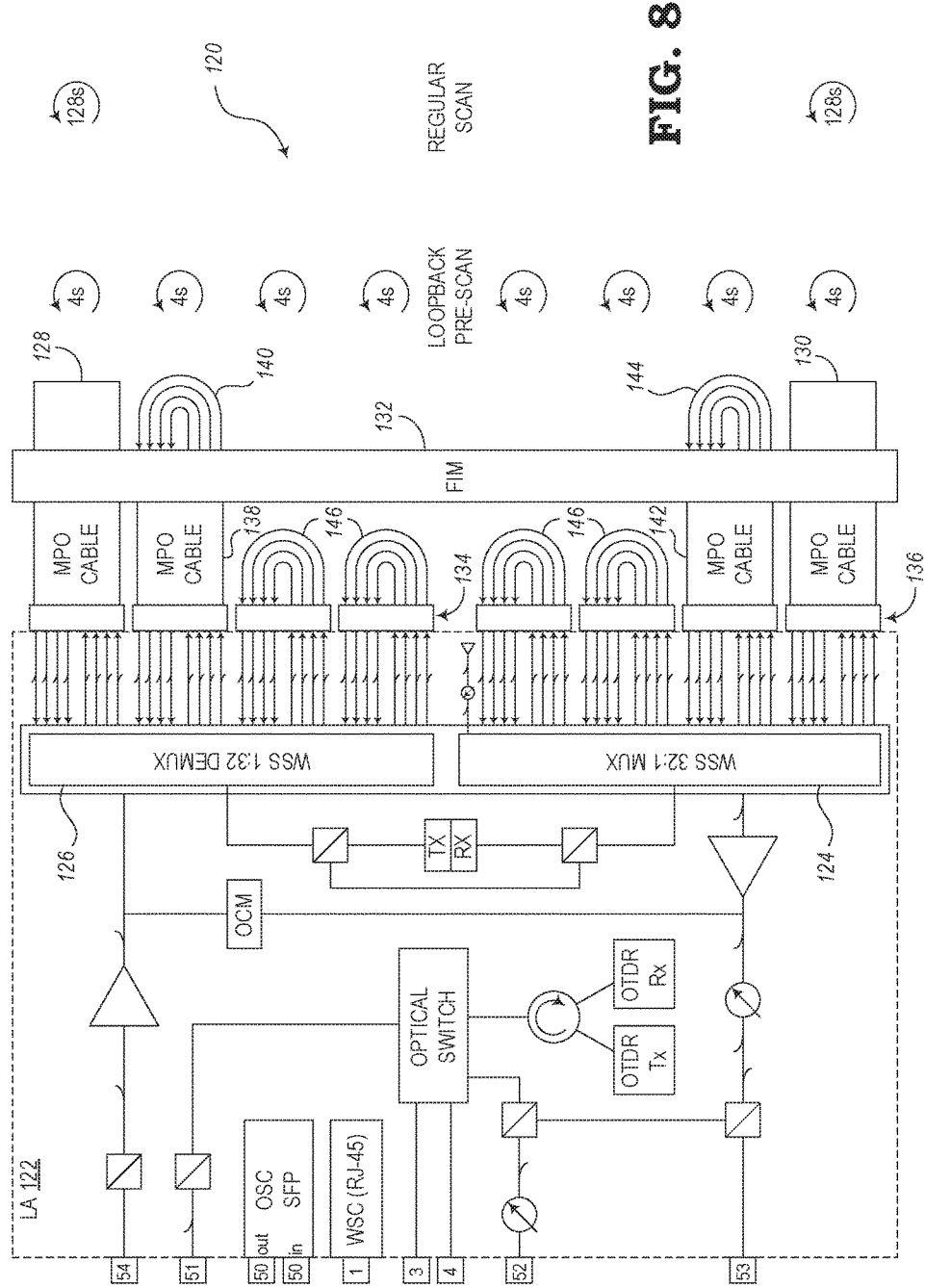
FIG. 8 is a schematic diagram illustrating another section of the ROADM of FIG. 1 for executing another CV scan that involves skipping unused ports by utilizing loopback connectors, according to various embodiments of the present disclosure.

FIG. 8 is a schematic diagram showing an embodiment of another section 120 of a node (e.g., ROADM 10 of FIG. 1) of an optical network. A process for executing another CV scan may involve skipping unused MPO ports by utilizing loopback connectors. The section 120 includes a ROADM with a Line Amplifier (LA) 122. For example, the LA 122 may be configured as a 32×1 C-band with OTDR 1×SFP. Among other components, the LA 122 may include a WSS multiplexer 124 (e.g., 32:1 MUX) and a WSS demultiplexer 126 (e.g., 1:32 DEMUX). MPO cables 128, 130 may be connected with FIM 132. The MPO cable 128 may be connected to one of the connector terminals 134 of the WSS demultiplexer 126 and the MPO cable 130 may be connected to one of the connector terminals 136 of the WSS multiplexer 124.

As shown in this example, one of the connector terminals 134 is connected to an MPO cable 138 having loopback connections 140 via the FIM 132. Also, one of the connector terminals 136 is connected to an MPO cable 142 having loopback connection 144 via the FIM 132. In the embodiment of FIG. 8, the remaining connector terminals 134, 136 may be configured with loopback connections 146 without the use of the FIM 132.

According to a CV method with the loopback connections shown in FIG. 8, link provisioning may not be required for CV optimization. The loopback connectors are positioned on the unused ports for optimized performance. In some embodiments, all the unused ports may be connected to some type of loopback connector.

In a loopback pre-scanning process, the CV method may implement a two-phase enhanced scan where Tx and Rx scan cycles are pre-empted to run initially in lock-step before entering the standard cycle of scanning Tx and Rx independently. The loopback pre-scan may begin at the start of an enhanced scan cycle. The Tx and Rx components may be locally configured to synchronously scan all switch ports in sequence. Since the Tx and Rx components may be focused on each other, the dwell time can be minimal (e.g., about one second) and the ports can be scanned in short order. For example, pre-scan may last about four seconds per connector terminal 134, 136 such that, with eight connector terminals 134, 136, the total pre-scan time will be about 32 seconds for a 1×32 LA. During the pre-scan, Tx/Rx pairs which match may be identified as loopback and can be excluded from the independent CV scan phase.

In some embodiments, the loopback connectors can be deployed as is shown in FIG. 8. In this case, the CV described with respect to FIG. 8 may include quickly scanning ahead of time to see which paths loop back and which ones can actually be reconnected. With this initial test, it is possible to focus on only the reconnectable ones as they are being reconnected and simply avoid the loopback ones.

This loopback pre-scan process may further be configured such that a second phase scan may be similar to other scans except that the total time may be:

$$(N_{MaxRx}-N_{Loopback}) \times NTX \times Tx\_dwell\_time$$

For example, with only one quad group populated, the scan time might be (32−24)×(32)×(1 second)=256 seconds (or 4.3 minutes), as opposed to 17 minutes in conventional algorithms. The total time (with the 32 second pre-scan time) may include:

32 seconds (pre-scan)+256 seconds (CV scan)=288 seconds (about 4.8 minutes)

This total cycle time would be associated with a four-degree node. When a new degree is inserted, the loopback pre-scan may be manually initiated on nodes that are already in service.

Advantages of New CV Modes

FIG. 9 is a chart 150 illustrating examples of expected times for running the various CV scans on an optical node (e.g., ROADM 10 of FIG. 1) according to the various processes described in the present disclosure. The chart 150 also shows a comparison with a conventional method. Also, comments (which may also include the corresponding explanations described above with respect to each respective technique) are also provided in the chart 150. The total CV scan times are shown for a four-degree (4D) node, an eight-degree (8D) node, and a 16-degree (16D) node are included.

In particular, the chart 150 shows that the conventional CV time may be about 25 minutes. A "full node, optimized" method (which may correspond to the embodiments described with respect to FIG. 5) results in a decrease in CV scan time down to about 15 minutes, 13 minutes, and 9 minutes for the 4D, 8D, and 16D nodes, respectively. A "skip non-provisioned ports" method (which may correspond to the embodiments described with respect to FIG. 7) results in a decrease in CV scan time down to about 0.5 minutes, 2.1 minutes, and 8.5 minutes for 4D, 8D, and 16D nodes, respectively. A "skip non-loopback ports" method (which may correspond to the embodiments described with respect to FIG. 8) results in a decrease in CV scan time down to about 1 minute, 2.4 minutes, and 8.5 minutes for the 4D, 8D, and 16D nodes, respectively. A "troubleshooting" method (which may correspond to the embodiments described with respect to FIG. 3) may be a preferred method that results in a decrease in CV scan time less than about 10 seconds for each of 4D, 8D, and 16D nodes.

In summary, conventional systems may include CV algorithms that run continuously on reconfigurable line platforms. The embodiments of the present disclosure may be incorporated into existing platforms or newer platforms as well where receivers/terminators may be in communication with FIMs. The new CV algorithms may be run in a disaggregated environment, such as where one device (e.g., a MUX) may be manufactured by one company and another device (e.g., a DEMUX) may be manufactured by another company. One of the goals of a disaggregated environment is to support CV with integrated connection verification from any given degree.

For CV, a laser Tx source may be implemented on one side (e.g., a MUX side) and may keep transmitting CV signals sequentially on every port. On the Rx side, each port may be configured to continue looking for a certain amount of time to see if the CV Tx signal is received, and then the waiting process moves on to the next port, and so on, until each different port has a chance to determine the connectivity. The CV protocol includes a single Tx source and every individual Rx termination that is essentially blind to the source. There is no predetermined coordination, which requires a test on each possible path from the single Tx source to the multiple Rx terminations. Thus, the total CV scan time is dependent on the number Tx and Rx ports. For example, there may be 20 switch ports on the Tx side where each switch port takes about a second to broadcast its CV signal. On the Rx side, each port may continue searching for at least about 30 seconds to make sure that the Tx level is complete, before moving on to the next Rx switch port. By waiting for a source signal for a long enough time (based on the number of Tx ports and Tx dwell times), the Rx will eventually receive the Tx signal. In contrast, however, the embodiments of the present disclosure may utilize a similar architecture but may instead use different types of CV processes, as described above, to overcome the limitations of the conventional methods in order to reduce the total CV times.

The CV algorithms described in the present disclosure have novelty with respect to conventional CV methods. For example, the present CV processes can create a dynamic leader/follower (e.g., master/slave) formation among interconnected degree nodes in a consolidated setup without a shelf/chassis identifier to allow a focused debugging on a given MPO cable. The present CV processes also introduce the concept of skipping unused ports, which may save a lot of time in a high port count ROADM node for a regular mode of operation and also introduce the concept of populating unused ports with loopback connectors so that a card can quickly and independently determine which ports are unused.

The novel concept of skipping already in-service ports may be based on an assumption that in-service ports are already carrying traffic and do not require further connection validation if degree fiber loss can be measured (externally or internally) based on total power deltas, rather than relying on CV Tx/Rx powers. Also, the novel CV processes described herein provide received port-IDs as part of a transmit packet, which allows in-service ports to be skipped, even in a transmit direction. Also, the present embodiments have novelty in that they provide additional Tx information to optimize the Rx dwell time. Another novel feature is that a known good IL or power threshold that eliminates the need to filter for ghosts may allow the Rx listening to move immediately to a next port instead of waiting an entire Tx dwell time.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A controller configured to manage Connection Validation (CV) in a portion of an optical network, the controller comprising
 a processing device, and
 a memory device in communication with the processing device, the memory device configured to store a computer program having instructions that, when executed, enable the processing device to
  receive a request to perform a focused CV on one or more communication cables after the one or more communication cables are physically connected or reconnected into a network node arranged in the portion of the optical network,
  interrupt an ongoing CV running in the portion of the optical network, and
  execute the focused CV to target a CV scan on the one or more communication cables.

2. The controller of claim 1, wherein the instructions, when executed, further enable the processing device to resume the ongoing CV after the focused CV is complete.

3. The controller of claim 1, wherein the network node is a Reconfigurable Optical Add/Drop Multiplexer (ROADM).

4. The controller of claim 1, wherein each of the one or more communication cables is physically connected or reconnected between a first component of a Reconfigurable Optical Add/Drop Multiplexer (ROADM) and a second component of the ROADM, wherein the first component is a degree component and the second component is one of an add/drop component and another degree component.

5. The controller of claim 4, wherein the instructions, when executed, further enable the processing device to create a leader/follower formation where one of the first and second components is established as a leader and the other of the first and second components is established as a follower.

6. The controller of claim 1, wherein the one or more communication cables include one or more Multi-fiber Push-On (MPO) connector cables.

7. The controller of claim 1, wherein the instructions, when executed, further enable the processing device to
 detect a transmission power at a CV source near one end of the one or more communication cables,
 detect a reception power at a CV receiver near an opposite end of the one or more communication cables, and
 calculate a signal loss through the one or more communication cables based on the transmission power and reception power.

8. The controller of claim 7, wherein the instructions, when executed, further enable the processing device to execute the focused CV by
 comparing the signal loss with a predetermined threshold to determine if a connection between the CV source and the CV receiver is acceptable, and
 skipping a process of checking for other connections in response to determining that the connection is acceptable.

9. The controller of claim 1, wherein the optical network is configured as one of a homogeneous network and a disaggregated network.

10. The controller of claim 1, wherein executing the focused CV reduces a cycle time compared with the ongoing CV.

11. The controller of claim 1, wherein the focused CV and the ongoing CV include transmitting a CV packet from a transmitter (Tx) to a receiver (Rx), and wherein the CV packet includes one or more of a number of Tx ports in use, a Tx dwell time, a total Tx scanning time, and a Rx port identifier.

12. A method comprising the steps of:
 receiving a request to perform a focused Connection Validation (CV) on one or more communication cables after the one or more communication cables are physically connected or reconnected into a portion of an optical network,
 interrupting an ongoing CV running in the portion of the optical network, and
 executing the focused CV to target a CV scan on the one or more communication cables.

13. The method of claim 12, further comprising the step of resuming the ongoing CV after the focused CV is complete.

14. The method of claim 12, wherein the portion of the optical network includes a Reconfigurable Optical Add/Drop Multiplexer (ROADM).

15. The method of claim 14, wherein each of the one or more communication cables is physically connected or reconnected between a first component of the ROADM and a second component of the ROADM, wherein the first component is a degree component and the second component is one of an add/drop component and another degree component, and wherein one of the first and second components is established as a leader and the other of the first and second components is established as a follower in a leader/follower formation.

16. The method of claim 14, wherein the one or more communication cables include one or more Multi-fiber Push-On (MPO) connector cables.

17. The method of claim 12, further comprising the steps of
   detecting a transmission power at a CV source near one end of the one or more communication cables,
   detecting a reception power at a CV receiver near an opposite end of the one or more communication cables, and
   calculating a signal loss through the one or more communication cables based on the transmission power and reception power.

18. The method of claim 17, wherein the step of executing the focused CV includes the steps of
   comparing the signal loss with a predetermined threshold to determine if a connection between the CV source and the CV receiver is acceptable, and
   skipping a process of checking for other connections in response to determining that the connection is acceptable.

19. A node of an optical network, the node comprising:
   a Connection Validation (CV) source of a first component; and
   a CV receiver of a second component configured to perform CV scans on one or more communication cables, the CV source and CV receiver are configured to
      receive a request to perform a focused CV on the one or more communication cables after the one or more communication cables are physically connected or reconnected between the first component and the second component,
      interrupt an ongoing CV running between the first component and the second component, and
      execute the focused CV to target a CV scan on the one or more communication cables.

20. The node of claim 19, wherein the CV source and CV receiver are configured to resume the ongoing CV after the focused CV is complete.

* * * * *